United States Patent [19]
Faress et al.

[11] 3,811,164
[45] May 21, 1974

[54] IRONER ROLL COVER AND METHOD
[75] Inventors: Sidney M. Faress; Dallas C. Thomas, both of Hogansville, Ga.
[73] Assignee: Uniroyal Inc., New York, N.Y.
[22] Filed: May 16, 1973
[21] Appl. No.: 360,877

Related U.S. Application Data
[63] Continuation-in-part of Ser. No. 220,947, Jan. 26, 1972, abandoned, Continuation-in-part of Ser. No. 293,966, Oct. 2, 1972, abandoned.

[52] U.S. Cl................................................ 29/128
[51] Int. Cl........................................... B21b 31/08
[58] Field of Search............. 29/128, 131, 110, 118; 38/66, 68

[56] References Cited
UNITED STATES PATENTS

| | | | |
|---|---|---|---|
| 1,636,471 | 7/1927 | Hedglon................ | 29/128 |
| 1,973,044 | 9/1934 | Brann.................... | 29/128 |
| 2,033,894 | 3/1936 | Crockford............. | 29/128 |
| 2,272,238 | 2/1942 | Castricone............ | 29/128 |
| 2,499,015 | 2/1950 | Baker................... | 29/128 |
| 2,534,818 | 12/1950 | Holroyd et al...... | 29/128 X |
| 2,608,749 | 9/1952 | Obitz.................... | 29/128 |
| 2,672,678 | 3/1954 | Forman................ | 29/128 |
| 508,595 | 11/1893 | Barrett.................. | 29/131 |

Primary Examiner—Alfred R. Guest
Attorney, Agent, or Firm—Robert J. Patterson, Esq.

[57] ABSTRACT

Disclosed is a cover for an ironer roll comprising a fabric one portion of which is impregnated with thermosetting resinous material, such as a phenolic resin, subsequently converted to thermoset form and another portion of which is unimpregnated. The unimpregnated portion of the fabric acts as a liner or padding for the impregnated portion while the impregnated portion serves as the work-contacting surface. Because the liner portion and the work-engaging portion of the cover are integrally formed from a single sheet of fabric, no seam or stitching is required for joining the two portions. Thus, the unevenness caused by a seam is eliminated and manufacturing costs are reduced.

Also disclosed is a method of making such a cover.

In a preferred embodiment, the cover embodies a narrow portion which is located between the unimpregnated liner or padding portion and the impregnated work-engaging portion and impregnated to a considerably less extent than the work-engaging portion whereby it provides a transitional zone between the unimpregnated portion and the work-contacting portion.

10 Claims, 5 Drawing Figures

IRONER ROLL COVER AND METHOD

CROSS-REFERENCE TO RELATED APPLICATION

This application is a continuation-in-part of our co-pending applications Ser. No. 220,947, filed Jan. 26, 1972 (now abandoned) and Ser. No. 293,966, filed Oct. 2, 1972 (also abandoned).

BACKGROUND OF THE INVENTION

Commercial laundries commonly use power driven rolls usually known as flatwork ironers. Frequently four or more power driven rolls are used in a single unit of equipment. These rolls are usually covered with asbestos fabric. Such fabric is commonly woven from yarns which are called asbestos yarns although they generally contain a small proportion of staple fiber other than asbestos for the purpose of holding the asbestos fibers in position.

It has heretofore been proposed to treat the asbestos fabric of ironer roll covers with a material to make the work-contacting surface smooth, durable, tough, tear-resistant and wear-resistant. For example U.S. Pat. No. 2,534,818 issued to Holroyd et al. shows the provision of a liner or padding wound around the roll prior to applying an asbestos cover prepared by passing woven asbestos fabric through an aqueous impregnating bath containing a thermosetting resin, such as a melamine-formaldehyde resin, in solution in water together with a thermoplastic resin, such as polymerized methyl methacrylate, and wax in emulsion, drying, calendering and curing whereby the intermingled resins and wax give the fabric a smooth porous surface, good wear-resisting properties and good tear-resisting properties.

Similarly, U.S. Pat. No. 2,033,894 to Crockford shows a flatwork ironer roll comprising a padding layer 6 which may supplement the usual padding or replace it altogether. Layer 6 is preferably made of woven asbestos fabric. Around layer 6 is disposed protective insulating layer 5 which likewise is made from woven asbestos fabric but is provided with resinous impregnation 10 which typically is a heat-hardened phenolic resin material. The cured resinous material imparts to the asbestos roll covering a smooth and indurated surface which does not materially impair the flexible properties of the fabric. Protective covering 5 is shown as a prolongation of the unimpregnated asbestos padding layer 6, the two layers being integrated by lines of stitching 8 which secure the lapped ends together.

U.S. Pat. No. 2,333,824 to Schoepf shows an ironer roll cover unit which comprises a multiply woven fabric pad section 11 adapted to be wrapped around the roll and a single ply inner fabric outer cover section woven with similar weft threads than the weft threads in the pad section, the two sections being woven as a single unit with common warp thread extending continuously throughout the length of the unit. The weft threads of both sections preferably are asbestos threads and the warp threads likewise preferably are constituted by some form of asbestos thread.

None of the patents referred to in the foregoing teaches the present invention which resides in an ironer roll cover unit comprising a length of fabric having the same construction throughout so that no fabric seam is present, thereby eliminating unevenness and the necessity for seaming, and having a padding portion which constitutes a base layer on the roll and is free from resinous material or other solid material which would materially reduce the padding effectiveness of the padding portion. The roll cover unit of the present invention also embodies a portion which constitutes an outer work-contacting section which is based upon an integral portion of the fabric forming merely an extension of the fabric used in the padding portion. This work-contacting section is formed by impregnating the fabric constituting this portion with a thermosetting resinous material which provides the desired porosity, smoothness, heat resistance, wear resistance and other qualities required in the work-contacting portion or an ironer roll cover. The fabric used for both the padding portion and the work-contacting portion preferably is a woven fabric made with warp and weft yarns both of which contain enough heat-resisting fiber to give a high degree of heat resistance, both warp and weft desirably comprising predominantly or exclusively heat-resisting fibers.

SUMMARY OF THE INVENTION

In its product aspects, the invention comprises an ironer roll cover comprising a single sheet of fabric having a length equal to the length of the ironer roll to be covered and a width sufficient to enable the fabric to be wound a plurality of times around the ironer roll, this fabric having a first longitudinal portion sufficiently wide to enable it to extend for at least one full turn around the ironer roll and having a second parallel longitudinal portion sufficiently wide to enable it to extend for at least one full turn around the first longitudinal portion when the latter is positioned around the roll, the second portion being impregnated with a thermoset resinous material and the first portion being free of resinous material or other solid material which would materially reduce the padding effectiveness, whereby the first portion constitutes a padding for the second portion and the second portion constitutes the work-contacting portion of the cover and has a surface which is smooth, heat-resistant and wear-resistant for ironing purposes. In one embodiment the first and second portions of the cover adjoin one another. In another, and preferred embodiment, the first and second portions are separated from one another by a narrow (relative to the widths of the first and second portions) partially impregnated intermediate parallel portion of the same sheet of fabric from which the first and second portions are formed. This intermediate portion provides a transitional zone between the first and second portions on the roll as a result of the feathered edge effect of the intermediate zone which is usually from about 1/4 to 3/4 inch wide and typically about 1/2 inch wide, this effect being due to the significantly lower extent of impregnation of the fabric in the intermediate zone as compared to the work-contacting portion.

In its method aspects, the invention is a method of making an ironer roll cover comprising applying a liquid coating composition containing a thermosetting resinous material, typically in solution in a volatile organic solvent, to a portion only of a single sheet of the fabric base material and thereby effecting selective impregnation of such portion (which is to constitute the work-contacting part of the cover), drying the impregnated fabric to remove volatiles therefrom, curing the resinous material deposited on and through the fabric to thermoset condition, and preferably thereafter calendering the surface of the impregnated portion of the resulting fabric sheet to form a smooth finished work-contacting portion. More specifically, the method comprises a method as just set forth herein the base fabric initially contains a substantial proportion of water, say 90–100 percent by weight based on the total weight of the fabric, and is dried to remove substantially all of said water prior to being subjected to the impregnating step just described. A preferred method involves the feature of obtaining the aforementioned intermediate portion, which is substantially more flexible than the work-contacting impregnated area of the final product, by applying liquid water on the fabric in a band parallel to and adjacent the area which is to be fully impregnated and which is to constitute the work-contacting surface and also adjacent the unimpregnated area which is to constitute the padding portion. Typically this is achieved by squirting a stream of liquid water onto the fabric in the area which thereafter is adjacent the divider in the conventional impregnating equipment customarily used. This liquid water is injected onto the fabric as it moves towards the impregnating step over an area having a width corresponding to that of the desired intermediate transitional portion and operates in some manner to markedly reduce the amount of impregnating resin the cloth picks up in that area and correspondingly reduce the resin "add-on" (dry weight of resin solids remaining after processing to remove volatiles, based on the weight of the fabric) in that area.

DESCRIPTION OF THE PREFERRED EMBODIMENTS

Figure 1:
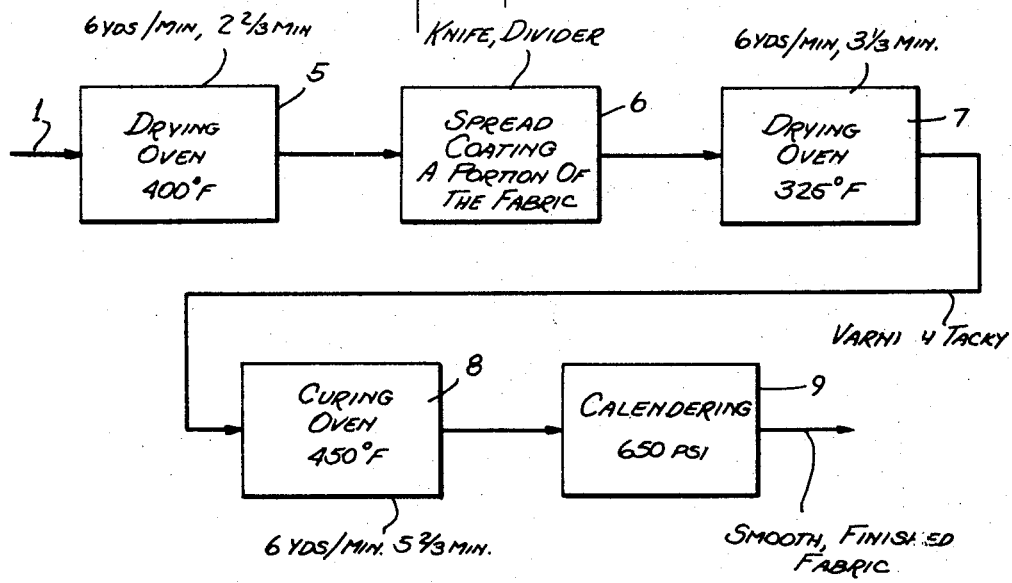
FIG. 1 is a block diagram of a preferred method used for treating the base fabric in the manufacture of an ironer roll cover of the invention.

Referring now to FIG. 1, a sheet of fabric 1, which typically contains a substantial proportion of moisture and may even be wet with liquid water, is fed into a drying oven 5 at 400°F. at a speed of 6 yards per minute, for an exposure time of 2 2/3 minutes, to remove the water and moisture and preheat the fabric for the impregnating step. Then the fabric passes through coating equipment 6, which usually embodies a conventional spreading knife and a knife edge divider serving to apply a liquid containing a thermosetting resinous material, preferably a phenolic resin material, to only that portion of the fabric which is to serve as the work-contacting surface in the final cover.

Techniques for coating or impregnating only a portion of a sheet have long been known in other arts, as shown by U.S. Pat. Nos. 1,206,501 to Bell et al.; 1,571,706 to Carmichael; and 2,766,717 to Neidich et al.

Any suitable liquid thermosetting impregnating material can be used. Solutions of thermosetting resins, especially thermosetting phenolic resins, in volatile organic solvents such as toluene or the like are preferred. The selection of a suitable impregnating liquid is well within the skill of the ironer roll cover art. An example of a composition which has been found eminently satisfactory is one composed of two parts by volume of a material known as "Sterling Thermobond Varnish R740," one part of "Sterling Thermobond Varnish T707" and one part of toluene. The two varnishes referred to are liquid phenolic resins made by Sterling Varnish Co. of Szwickley, Pa.

The fabric used in practicing the present invention can be of any type which is suitable as an ironer roll cover material. Almost invariably it is a woven fabric but it could be a so-called non-woven fabric or a knit fabric. A suitable base fabric is a five harness sateen woven fabric consisting of 18–3 cut asbestos yarn warp and 12–6 cut asbestos yarn filling. This fabric is woven using a 9.70 dent reed with the warp yarns being drawn five ends per dent. This fabric consists of 30.5 ends per inch and 26 picks per inch and is woven 90 inches in width. The weave and other characteristics of the base fabric should be so correlated with the thermosetting resinous impregnating material that the latter will completely permeate or otherwise soak through the asbestos fabric. The base fabric sould be one which will not burn or char under the heat or ironing.

The partially impregnated fabric travels from coating equipment 6 through a drying oven 7 which serves to drive off substantially all volatile material from the impregnating composition. The drying oven 7 is preferably at a temperature of 325°F. and the sheet travels through the oven at 6 yards per minute for 3 1/3 minutes. The impregnating material is tacky as the fabric leaves oven 7. The assembly is now fed through a curing oven 8 which typically is at a temperature of 450°F. and the composite fabric travels through this curing oven for 5 2/3 minutes at a rate of 6 yards per minute. In the course of passage through the curing oven 8 the thermosetting impregnating material is cured to thermoset condition. The composite fabric is then calendered in a step indicated by reference numeral 9. In the calendering step the composite fabric is calendered by passing it into the nip of a heated polished stainless steel roll and another roll which preferably is a husk-filled roll (typically made of elastomeric material filled with a combination of cotton husks and corn husks). The steel roll is in contact with the surface of the impregnated portion which is to contact the work in service. Preferably the pressure exerted on the fabric by the two rolls of the calender is 650 psi.

In the calendering step the fabric typically is fed around a first husk-filled roll, which acts as a guide roll, then into contact with the stainless steel roll for a contacting arc of about 90°, then through the nip of the stainless steel roll and a second husk-filled roll, and around this latter roll, either into a wind-up zone for subsequent cutting-to-length to make the finished covers or into a cutting zone for such cutting to length.

Figure 2:
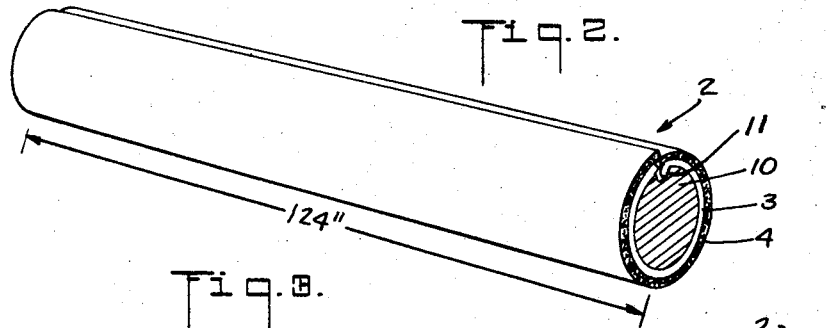
FIG. 2 is a perspective view of an ironer roll covered with the cover of the invention.

The reason for using the combination of a steel roll and a husk-filled roll for performing the calendering step is that this combination produces a cover which has a good, smooth hand in its work-contacting portion and does not crush the fabric excessively. The fabric is now smooth and finished in its impregnated portion and ready to be placed upon the roll 10 (FIG. 2) for use in actual service. In FIG. 2, the ironer roll 10 is shown wrapped with the covering of the invention, generally designated by reference numeral 2. The covering consists of the inner padding layer 3 which is formed from the unimpregnated portion of the fabric and an outer work-contacting portion 4 which is formed from the impregnated portion of the fabric. The padding 3 may consist of one or several layers of the unimpregnated fabric wound about roll 10. The longitudinal groove 11 in roll 10 receives the edge of padding portion 3 at the start of the application of the cover. The outer work-contacting portion 4 almost invariably consists of only a single turn around the roll. Roll 10 is usually 124 inches long and one to 3 inches in diameter.

Figure 3:
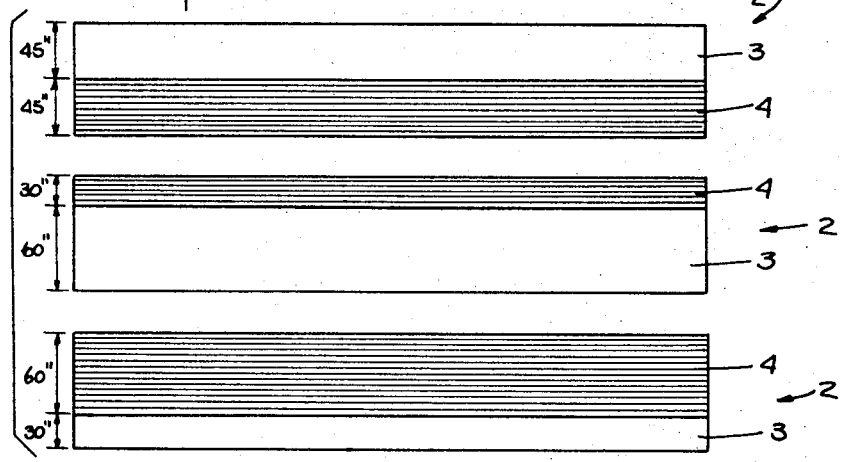
FIG. 3 is a plan view of three different patterns of ironer roll covers of the invention.

FIG. 3 illustrates three coverings 2, each having an unimpregnated padding section 3 and an impregnated work-contacting section 4. As can be seen, various widths can be achieved for the impregnated and unimpregnated portions of the cover, depending on the particular requirements. The length, 124 inches, shown in FIG. 2 is the standard length of roll used in commercial flatwork ironers.

The selection of equipment for carrying out the impregnating step will be well within the skill of the impregnating art. Typically a knife-coating or knife-spreading unit will be provided with a divider of conventional well-known type which limits access of the impregnating material to that portion of the base fabric sheet which is to form the work-contacting layer.

Figure 4:
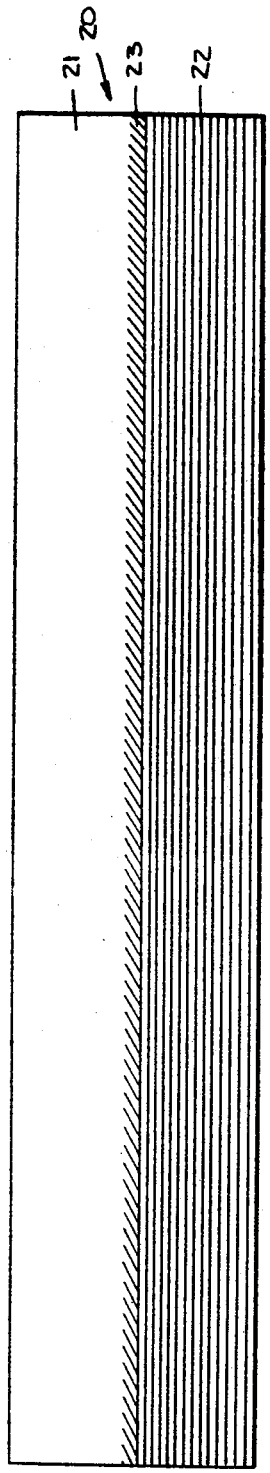
FIG. 4 is a plan view of a modified ironer roll cover of the invention, this cover being characterized by having an intermediate area having less impregnation and therefore giving a feathered edge or transitional effect between the unimpregnated padding or liner portion and the highly impregnated work-contacting portion.

FIG. 4 portrays a preferred type of cover of the present invention. The cover 20 shown in this figure comprises an unimpregnated padding portion 21, a fully impregnated work-contacting portion 22, and a narrow intermediate or transitional portion 23 which provides the "feathered edge" effect referred to above and is characterized by impregnation to a much less extent than work-contacting portion 22 so that it creates little or no problem of unevenness when the roll is placed in service.

Figure 5:
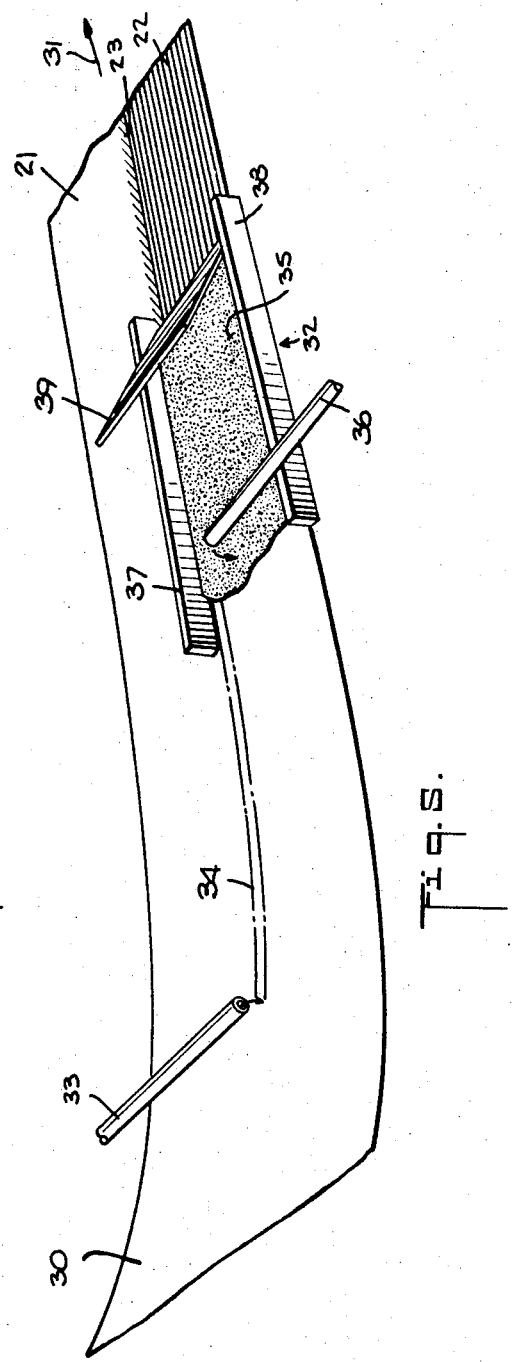
FIG. 5 is a schematic perspective view of impregnating equipment suitable for making the modified ironer roll cover of FIG. 4.

Cover 20 of FIG. 4 is preferably made in the manner portrayed in FIG. 5. In FIG. 5 the fabric 30, which has been dried to remove water, is fed in the direction indicated by arrow 31 to the impregnating apparatus 32. A stream of water is fed via pipe 33 onto fabric 30 as it is about to enter the impregnation zone, forming a narrow band 34 of water-saturated fabric at an appropriate intermediate point in fabric 30. The portion of fabric 30 which is to be impregnated passes under pool 35 of liquid coating composition replenished via pipe 36 and confined laterally between a dam 37 located at the edge of band 34 next to fabric portion 21 which is to be unimpregnated and a dam 38 at the opposite edge of the impregnated portion of the fabric. The scraper blade 39 prevents excess impregnating material from remaining on the surface of the composite three-zone fabric seen at the right of FIG. 5 as it leaves the impregnating equipment. The fabric is then fed to the curing zone and thence to the calendering step.

It will be understood by those skilled in the art that the equipment portrayed in FIG. 5 is illustrative only and that innumerable arrangements of apparatus can be employed to achieve the desired result of impregnation with liquid water along an intermediate zone in the fabric followed by complete impregnation with the resinous composition in the area to form the work-contacting portion and limited impregnation with the resinous composition in the intermediate zone.

EXAMPLE 1

In this example the base fabric was a five harness sateen woven asbestos fabric of the particular type described in detail above and the impregnating formulation consisted of 50 percent "R740 Thermobond Varnish," 25 percent "T707 Thermobond Varnish" and 25 percent toluene. The two types of varnish were combined in a suitable mixing container. The toluene was added last and the entire mixture stirred for about 5 minutes with a rotary mixer. Half width impregnation of the 90 inch wide fabric and a feathered edge transition strip were applied to the fabric in the following way. The fabric was first wet thoroughly with water in a padder which consisted of two dip pans and two rubber rolls with a steel center roll. The fabric was dipped in water in each pan and then padded between a steel roll and a rubber roll using 60 pounds gauge pressure. Next the fabric was passed through a weft straightener device to correct any bow and skew problems in the fabric. Next the face and filling sides of the fabric were brushed with rotating fiber brushes to adjust porosity and remove excess fiber from the face. After brushing, the fabric was tentered and dried using a pin tenter covered with an oven. The oven temperature was 400°F. and the speed of travel of the fabric was 6 yards per minute. The length of the tenter was 60 feet of which 44 feet were covered with the oven.

After emerging from the oven, the fabric was passed against a flat spread coating board and by use of a stainless steel dam the impregnating composition was applied against 51 inches of the total 90 inch wide cloth. Just prior to the application of the resin impregnating solution, a fine stream of water was applied to that portion of the fabric that would form the last 1/2 inch of the treated portion of the cloth. The purpose of this water application was to reduce the amount of impregnating resin the cloth would pick up in that area, thus creating a more gradual transition from the untreated to the treated sections of the final ironer roll cover. After application of the impregnating solution, the fabric was passed through two scraper rods to remove all excess impregnating solution.

The fabric was then dried in a dryer at 325°F. and then cured in a curing oven at 450°F. Finally, the cloth was calendered between a stainless steel roll and a husk-filled roll using 650 pounds per square inch pressure. After calendering, the fabric was rolled up on a suitable tube for shipment and subsequent cutting to desired lengths to cover ironer rolls.

The weight of the uncoated (greige) asbestos fabric, the weights of the final impregnated fabric in the transition zone and the work area and the percent add-on in the transition zone and the work area of the product resulting from Example 1 are shown in the following tabulation:

| Greige | Transition Zone | Work Area |
| --- | --- | --- |

| | | | |
|---|---|---|---|
| Weight (oz./sq.yd.) | 22.81 | 26.57 | 27.52 |
| % Add-on (% of cured resin based on weight of fabric) | | 16.5% | 20.7% |

The specific proportions of R740 varnish, T707 varnish and toluene used in Example 1 were found by experimentation to give a well-cured resin. R740 varnish by itself develops a very flexible film when baked and shows an undesirably low tendency to harden. On the other hand, T707 varnish bakes out in a relatively shorter time at lower temperatures and forms a hard film; the amount of this type determines the hardness of the final coating, the curing time required, and the physical properties of the plastic film that is formed around the yarns and fibers of the base fabric. The toluene serves as a thinner. A composition based on R740 varnish only would not dry; some T707 varnish appears to be necessary to act as a drying agent; the more of this component used the stiffer the final film will be. An impregnating composition having the particular proportions mentioned above has been found to dry relatively quickly and give the desired flex qualities needed while not being too stiff. Those skilled in the art can readily determine how to formulate thermosetting impregnating compositions which will perform satisfactorily in the practice of the invention. It is not necessary to use the particular formulation described above; on the contrary, almost innumerable formulations can be successfully employed.

While the foregoing example is based on use of an asbestos fabric, we can use any other fabric having the characteristics which are requisite for ironer roll covers, one of the most important of which is adequate heat-resistance and good dimensional stability when exposed to temperatures up to 450°F. for prolonged periods of time, both during the curing step in manufacture of the ironer roll cover fabric and during service on the ironing equipment. Those skilled in the art will at once know, or be able with a minimum of effort to determine, what fabrics other than asbestos fabric would be suitable for use in the practice of the present invention.

Examples of other suitable base fabrics are those made from aromid (not a trademark) fiber which is available commercially in yarn form under the trademarks "Fiber B," "DP-01" and "Nomex." Aromid is the generic name for fiber made from the condensation product of isophthalic or terephthalic acid and m- or p-phenylenediamine. "Fiber B" is generally understood to be a product of the condensation of terephthalic acid and p-phenylenediamine while "Nomex" is understood to be a product of the condensation of isophthalic acid and m-phenylenediamine. Aromid is defined as "a manufactured fiber in which the fiber-forming substance is a long-chain synthetic aromatic polyamide in which at least 85 percent of the amide linkages are attached directly to two aromatic linkages."

We have found that fabric made from aromid fiber such as "Nomex" fiber (which is described in du Pont Bulletin N-245 entitled "Yarns and Fabrics of Nomex High-Temperature-Resistant Nylon Staple and Tow" and published March 1971, "Nomex High Temperature Resistant Nylon" published in 1972 by du Pont and in "Chemical Week," Jul. 5, 1972, page 25) is eminently suitable as the base fabric in the practice of the present invention. In addition to its excellent dimensional and chemical stability at temperatures up to 450°F. it is lighter than asbestos and it has been observed that ironer roll covers made in accordance with the present invention from "Nomex" (1) provide a smoother finish, (2) reduce starch build-up in service, (3) reduce drag on the chest of the ironing equipment, (4) withstand shock better, and (5) have longer operating life, all as compared to covers made from asbestos. Another advangae is that they obviate the health hazards incident to the use of asbestos.

EXAMPLE 2

This example illustrates the use of "Nomex" woven fabric in making ironer roll covers in accordance with the present invention.

"Nomex" greige fabric having the specifications set forth in column A of the table below was finished, thereby producing a fabric having the specifications set forth in column A, of the table. The finished fabric was then treated to effect impregnation of the transition zone and the work-contacting area with the same phenolic resin impregnating formulation as was used in Example 1 in the same manner as described in that example. The work area had the specifications set forth in column $A_2$ of the table.

A "Frazier" is a unit of measure indicating the porosity of a fabric in cubic feet/sq.ft./min.(CFM). One Frazier equals one cubic foot of air passing through 1 quare foot of fabric in 1 minute. "CC" is an abbreviation for Cotton Count. "Fill." is an abbreviation for filling; textile specialists normally refer to warp yarns and filling yarns.

| | A Unfinished & Uncoated | $A_1$ Finished but Uncoated | $A_2$ Finished & Coated |
|---|---|---|---|
| Weave | Plain | Plain | Plain |
| Weight (oz./sq.yd.) | 9.6 | 8.56 | 12.67 |
| Width (in.) | 90 | 90 | 90 |
| Construction | 37 × 33 | 37.5 × 31 | 41 × 30.7 |
| Frazier (CFM) | 70 | 64 | 13 |
| Grab Strength (warp) | 390 | — | — |
| Grab Strength (Fill.) | 360 | — | — |
| Yarn Size (warp) | 6/1 (CC) | 6/1 (CC) | 6/1 (CC) |
| Yarn Size | 6/1 (CC) | 6/1 (CC) | 6/1 (CC) |

The weights of the final impregnated fabric and the percent add-on in the transition zone and the work area of the product resulting from Example 2 were as follows:

| | Transition Zone | Work Area |
|---|---|---|
| Weight (oz./sq.yd.) | 11.84 | 12.67 |
| % Add-on (% of cured resin based on weight of fabric) | 38.2% | 48% |

Ironer roll covers made from the resulting fabric performed very satisfactorily.

EXAMPLE 3

A "Nomex" woven fabric having the following construction was impregnated in the same manner as in Examples 1 and 2.

| | |
|---|---|
| Weave | Plain |
| Weight (oz./sq.yd.) | 7.06 |
| Width (in.) | 90" |
| Construction | 39 × 34 |
| Frazier (CFM) | 46 |
| Grab Strength (warp) | 360 |
| Grab Strength (Fill.) | 300 |
| Yarn Size (warp) | 8/1 (CC) |
| Yarn Size (Fill.) | 8/1 (CC) |

Ironer roll covers made from the resulting fabric gave excellent performance.

GENERAL

It is essential that the final cured work-contacting surface of the cover be porous and pervious to water vapor in order to work properly on the heated ironer roll. In other words, complete coating of the working surface of the roll cover so as to render it completely impervious, or nearly so, is to be carefully avoided. The factors of porosity of the base fabric, the viscosity and other attributes of the impregnating liquid, and the method of effecting impregnation must all be regulated so as to achieve the desired effect. Those skilled in the art can readily select and determine these and all other factors involved in successfully carrying out the present invention, with a minimum of experimentation.

The amount of thermoset resin deposited on the woven asbestos fabric in the impregnated work-contacting portion of the covers of the invention can vary widely but typically ranges between 15 to 30 percent add-on (percent by weight of cured resin (dry weight) based on the dry weight of the fabric by itself); the amount of resin in the intermediate or transitional zone likewise can vary widely but typically ranges between 10 and 24 percent add-on.

In the case of covers which are based on woven "Nomex" fabrics, the amount of cured resin deposited in the work-contacting area can likewise vary widely but typically ranges from 30 to 50 percent add-on; in the transitional zone it typically ranges from 20 to 40 percent add-on.

We claim:

1. An ironer roll cover comprising a single sheet of fabric having a length equal to the length of the ironer roll to be covered and a width sufficient to enable the fabric to be wound a plurality of times around said ironer roll, said fabric having a first longitudinal portion sufficiently wide to enable it to extend for at least one full turn around said ironer roll and a second parallel longitudinal portion sufficiently wide to enable it to extend for at least one full turn around said first longitudinal portion, said second portion being impregnated with a thermosetting resinous material subsequently converted to thermoset condition and said first portion being free of resinous material, whereby said first portion constitutes a padding for said second portion and said second portion constitutes the work-contacting portion of the cover and has a surface which is heat-resistant, wear-resistant and otherwise suitable for ironing purposes.

2. An ironer roll cover as set forth in claim 1 wherein said fabric is a woven asbestos fabric.

3. An ironer roll cover as set forth in claim 2 wherein the amount of thermoset resin in said work-contacting portion ranges from 15 to 30 percent add-on by weight based on the weight of the fabric by itself.

4. An ironer roll cover as set forth in claim 3 wherein said resinous material is a phenolic resin.

5. An ironer roll cover as set forth in claim 1 wherein said fabric is a woven aromid fabric.

6. An ironer roll cover as set forth in claim 5 wherein the amount of thermoset resin in said work-contacting portion ranges from 30 to 50 percent add-on by weight based on the weight of the fabric by itself.

7. An ironer roll cover as set forth in claim 6 wherein said resinous material is a phenolic resin.

8. An ironer roll cover as set forth in claim 1 wherein said first and second portions adjoin one another.

9. An ironer roll cover as set forth in claim 1 wherein said first and second portions are separated from one another by an intermediate parallel portion which is much less fully impregnated with a thermosetting resinous material subsequently converted to thermoset condition than said second portion, whereby when said cover is wound around an ironer roll said intermediate portion provides a transitional zone between said first and second portions.

10. An ironer roll cover as set forth in claim 1 wherein said resinous material is a phenolic resin.

* * * * *